United States Patent
Knapp et al.

(10) Patent No.: US 8,719,223 B2
(45) Date of Patent: *May 6, 2014

(54) CLOUD STORAGE SOLUTION FOR READING AND WRITING FILES

(75) Inventors: Adam Knapp, Mesa, AZ (US); Brian Krouse, Tempe, AZ (US); Joseph Miller, Chandler, AZ (US); Eric Nilsen, Phoenix, AZ (US); Brent Strange, Gilbert, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 549 days.

This patent is subject to a terminal disclaimer.

(21) Appl. No.: 12/774,726

(22) Filed: May 6, 2010

(65) Prior Publication Data

US 2011/0276538 A1    Nov. 10, 2011

(51) Int. Cl.
*G06F 7/00* (2006.01)
*G06F 17/00* (2006.01)

(52) U.S. Cl.
USPC .......................................................... 707/626

(58) Field of Classification Search
None
See application file for complete search history.

(56) References Cited

U.S. PATENT DOCUMENTS

| | | | |
|---|---|---|---|
| 5,870,550 A | 2/1999 | Wesinger et al. | |
| 5,887,133 A | 3/1999 | Brown et al. | |
| 6,012,066 A | 1/2000 | Discount et al. | |
| 6,044,205 A | 3/2000 | Reed et al. | |
| 6,286,045 B1 | 9/2001 | Griffiths et al. | |
| 6,308,275 B1 | 10/2001 | Vaswani et al. | |
| 6,647,422 B2 | 11/2003 | Wesinger et al. | |
| 6,671,715 B1 | 12/2003 | Langseth et al. | |
| 6,842,769 B1 | 1/2005 | Kim et al. | |
| 6,868,444 B1 | 3/2005 | Kim et al. | |
| 6,871,214 B2 | 3/2005 | Parsons et al. | |
| 6,888,836 B1 | 5/2005 | Cherkasova | |
| 6,996,609 B2 | 2/2006 | Hickman et al. | |
| 7,007,080 B2 | 2/2006 | Wilson | |
| 7,007,093 B2 | 2/2006 | Spicer et al. | |
| 7,197,545 B1 | 3/2007 | Davie | |
| 7,386,880 B2 | 6/2008 | Wesinger et al. | |
| 2002/0178381 A1 | 11/2002 | Lee et al. | |
| 2003/0069953 A1 | 4/2003 | Bottom et al. | |

(Continued)

OTHER PUBLICATIONS

"Getting Started with Linux Shared Hosting", Dec. 7, 2006, 2.0, All.

(Continued)

*Primary Examiner* — Rehana Perveen
*Assistant Examiner* — Raheem Hoffler
(74) *Attorney, Agent, or Firm* — Chris S. Watt (57) ABSTRACT

Systems and methods of the present invention provide for a user uploading a file and a customized metadata about the file to a file storage system, and reading the same back upon request. This information may be forwarded to an application, possibly an API, which may divide the file into a plurality of file chunks if the file is greater than a predetermined file size. One or more tracker servers may check a database to locate optimal or current file locations for the file or file chunks to be stored within the file storage system. These optimal or current locations may be returned from the tracker servers to the application/API which may perform an HTTP request to write the file to or read the file from the file storage system. The file write may be validated and finalized, and the successful write or read may be displayed to the user on a user interface on a client.

30 Claims, 4 Drawing Sheets

(56) References Cited

U.S. PATENT DOCUMENTS

| | | |
|---|---|---|
| 2003/0120502 A1 | 6/2003 | Robb et al. |
| 2004/0088422 A1 | 5/2004 | Flynn et al. |
| 2007/0055647 A1* | 3/2007 | Mullins et al. ............... 707/2 |
| 2008/0141237 A1 | 6/2008 | Elad et al. |
| 2008/0243536 A1 | 10/2008 | Dworkin et al. |
| 2008/0243634 A1 | 10/2008 | Dworkin et al. |
| 2009/0313363 A1 | 12/2009 | Parsons et al. |
| 2009/0313364 A1 | 12/2009 | Parsons et al. |
| 2010/0332818 A1* | 12/2010 | Prahlad et al. ............ 713/150 |
| 2011/0106802 A1* | 5/2011 | Pinkney et al. ............. 707/737 |
| 2011/0252071 A1* | 10/2011 | Cidon ...................... 707/802 |

OTHER PUBLICATIONS

Greg Boss, Padma Malladi, Dennis Quan, Linda Legregni, Harold Hall, "IBM Cloud Computing", Oct. 8, 2007, Version 1.0.

Danga Interactive, "About MogileFS", found at http://www.danga.com/mogilefs/, May 10, 2010.

Jun. 12, 2012 Notice of Allowance in related patent U.S. Appl. No. 12/774,723.

* cited by examiner

CLOUD STORAGE SOLUTION FOR READING AND WRITING FILES

CROSS REFERENCE TO RELATED PATENT APPLICATIONS

This patent application is related to the following concurrently-filed patent applications:

U.S. patent application Ser. No. 12/774,723, "WRITING A FILE TO A CLOUD STORAGE SOLUTION."

U.S. patent application Ser. No. 12/774,725, "READING A FILE FROM A CLOUD STORAGE SOLUTION."

The subject matter of all patent applications is commonly owned and assigned to Go Daddy Operating Company, LLC. All prior applications are incorporated herein in their entirety by reference

FIELD OF THE INVENTION

The present inventions generally relate to the field of cloud storage and specifically to the field of reading and writing one or more files to a cloud storage solution.

SUMMARY OF THE INVENTION

The present inventions provide methods and systems for a user uploading a file and a customized metadata about the file to a file storage system. This information may be forwarded to an application, possibly an API, which may divide the file into a plurality of file chunks if the file is greater than a predetermined file size. One or more tracker servers may check a database to locate optimal file locations for the file or file chunks to be stored within the file storage system. These optimal locations may be returned from the tracker servers to the application/API which may perform an HTTP request to write the file to the file storage system. The file write may be validated and finalized, and the successful write may be displayed to the user on a user interface on a client.

The present inventions also provide methods and systems for a user requesting a file or a plurality of file chunks stored in a file storage system, and a customized metadata stored in data storage. One or more tracker servers may determine file locations in the file system, and the location of the customized metadata in the data storage. These locations may be returned to an application, possibly an API, which may determine one or more URLs for the file locations and perform an HTTP request to read the file or file chunks from the locations or URLs in the file system. The file or file chunks, along with the customized metadata, may then be returned and displayed to the user that requested them.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

As Internet use has become more popular, "cloud computing" has become more predominant. Cloud computing may be used as an alternative to having local servers or personal devices handling users' applications. In general, cloud computing may indicate that function or storage comes from "the cloud." The cloud is often understood to mean a public network, possibly based on TCP/IP networks, specifically often assumed to be the Internet, so that function within the environment does not come from a specific identifiable device.

In storing files to the Internet, cloud storage may be used. Cloud storage may refer to a model of networked data storage where data may be stored on multiple physical or virtual servers, generally hosted by third parties, rather than being hosted on dedicated servers.

The architecture behind cloud computing may include a network of "cloud servers" interconnected as if in a grid running in parallel, sometimes using techniques of virtualization, to maximize computing power per computer and/or server. In general, cloud computing may represent a subset of grid computing that may include utility computing and other approaches to the use of shared computing resources.

Writing a File to a Cloud Storage Solution

Several different methods may be used to provide and manage the disclosed invention. The disclosed method steps may describe one non-limiting example of a happy path of writing a file from an application/API to a file system, both described herein.

Figure 1:
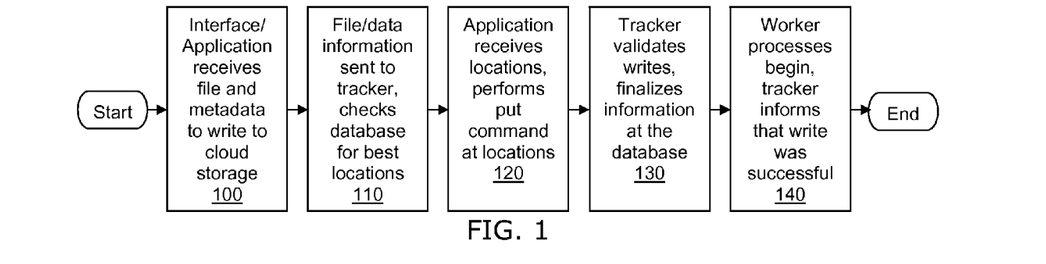
FIG. 1 is a flow diagram illustrating a possible embodiment of a method for writing a file to a cloud storage solution.
Figure 2:
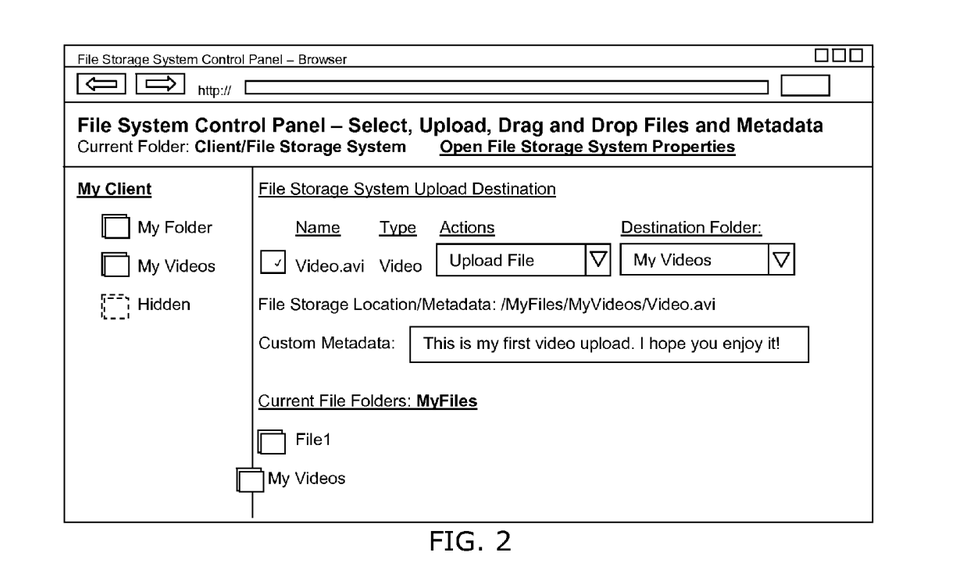
FIG. 2 illustrates a possible embodiment of an interface for writing a file to a cloud storage solution.
Figure 3:
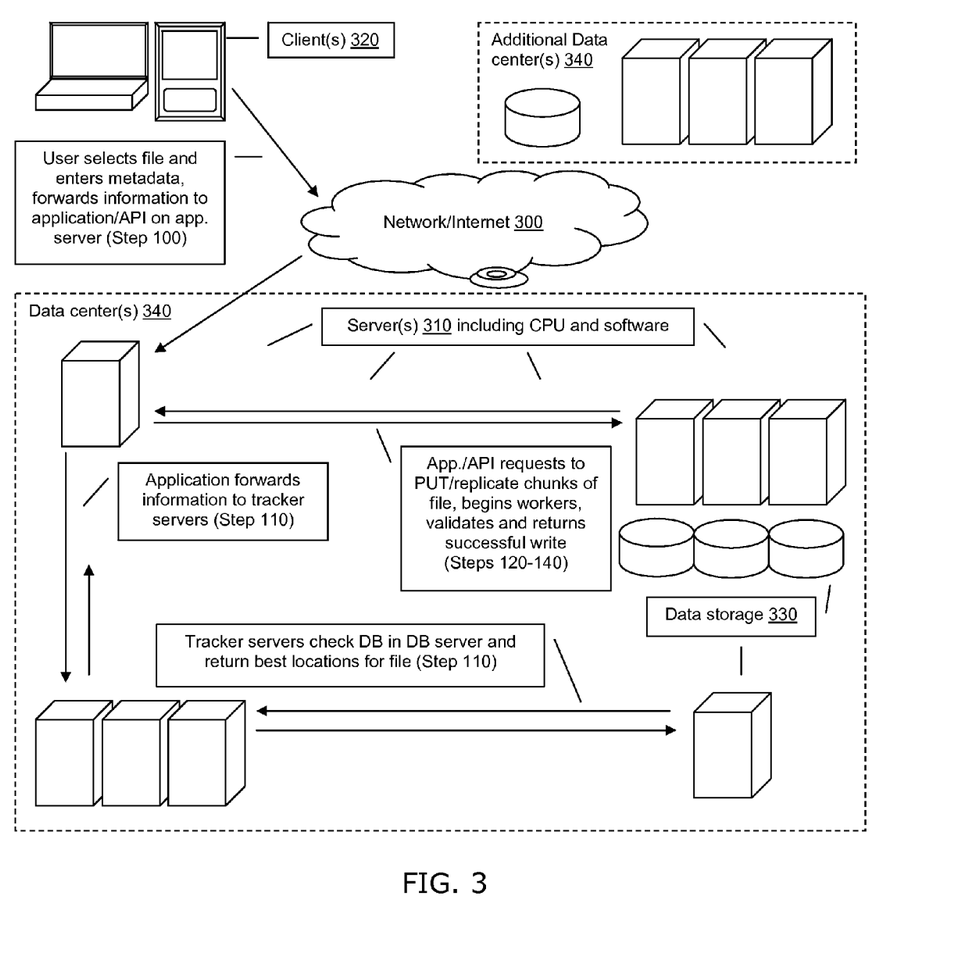
FIG. 3 illustrates a possible system for writing a file to a cloud storage solution.

In an example embodiment illustrated in FIGS. 1-3, a user of the system may select a file the user wants to write to a file storage system (possibly cloud storage) using an interface on a client communicatively coupled to a network. The user may input and include customized metadata with the file, possibly metadata about the file or the storage of the file, which may be written to a database in data storage, described below (Step 100).

As a non-limiting example, FIG. 2 shows an interface used to, as non-limiting examples, upload a file to an FTP site, an online file folder storage software, such as The Go Daddy Group's ONLINE FILE FOLDER, a video-based social media website, such as The Go Daddy Group's VIDEO.ME, etc. In this non-limiting example, the user may upload a file using a file upload dialog, combinations of checkboxes and drop-down lists, drag and drop technology to move a file from their client machine to the file system disclosed herein, etc. and may include customized metadata about the file and possibly storage location information about the file.

The interface and/or client may send the file information received from the user and metadata, possibly customized metadata, to an application, possibly an API described in detail below, used to store files in the file storage system (Step 100). The application/API may communicate information, including the file the application/API wants to write and/or the metadata, possibly customized metadata from the user, to one or more tracker servers described below. The tracker servers may check a database to locate a plurality of the best locations where the file may exist and return this information back to the application/API and/or the user interface. The file system may also write the metadata, possibly customized metadata, to the database (Step 110).

The user and/or application/API, now knowing the best locations for the file to exist and be stored, may use an HTTP request, possibly a PUT command, to store the file or chunks of the file, as described herein, at each of the plurality of optimal locations (Step 120). The file system may write the file in "chunks" to each of the plurality of locations if the file is greater than a pre-determined threshold for file size, and these chunks may be replicated according to the replication policy for the file system described herein.

As a non-limiting example, if "Video.avi," shown in FIG. 2 is 160 MB, and this file size is greater than a predetermined threshold, the file may be broken up into 16 MB chunks, and each of these chunks may be stored and replicated as necessary within the file storage system. This example embodiment should in no way limit the way the application/API divides file chunks. Such chunks can be any combination of file sizes, according to the embodiment in use. If the application fails writing the file or chunks of files to one destination midway, it can retry and write somewhere else. Once the application/API has completed writing to each of the plurality of locations, the application/API may communicate back to the tracker server, informing the tracker server that the writes were completed (Step 120). The application/API and/or client application may tell the tracker where it wrote to, possibly using a predefined method in the application/API.

The tracker server may then validate that the file writes were successful and finalize the information in the database, including that the file was written, the location of the file, any metadata and/or customized metadata, any file information disclosed herein, any other file or file storage system information or any combination thereof (Step 130).

The tracker servers may then link the file information into the domain's namespace via the database. Additional information for each file may include a key, a file class, a desired count or "desired state" for file replication according to a file replication policy described herein, a file domain, a file ID and a file namespace.

Each file may have a key comprising a unique textual string (basically any string) that identifies the file, for example /MyFiles/MyVideos/Video.avi. Each file may be a part of a class, which specifies the desired count or desired state for file replication according to a replication policy described herein. Each file may be located in a domain and the keys for the file may be unique within domains. Just as each file may be a part of a class, each class may be a part of a domain. A domain may be a top-level separation of files and may comprise a set of classes that define the files within the domain. A file ID may be an internal numerical representation of a file, and each file may have a unique file ID. Named keys in a flat, global namespace may identify files.

After the tracker validates that the file writes were successful and finalizes the information in the database, the background processes/workers may begin, including Replication workers, MetaStore workers, CheckSum workers or any other worker processes disclosed herein (Step 140). The tracker server, in the background, may then start replicating files among the storage node servers, or elsewhere in the file storage system, until it complies with that file class's replication policy, as described herein. The tracker server may then inform the client/application that the write was successful (Step 140).

The file system may be required to make sure that a predetermined number of valid copies of a file exist before telling the end user that a file was successfully written. In one non-limiting example embodiment, additional replication policies may require that the software on a tracker server locate the two (or any number of) best locations where the file should exist within the storage node servers when writing the file, sharing this information with the application/API when the destinations are known and requiring the system to make sure that two (or any number of required) valid copies of a file exist before telling the end user that a file was successfully written.

Cloud Storage Solution for Reading and Writing Files

Several different environments may be used to accomplish the steps of embodiments disclosed herein. The systems and environments used by the present inventions may comprise a large distributed HTTP-backed data store to provide and control redundancy/replication and to provide and control file retention. These systems and environments may represent a "cloud storage" solution offering or cloud storage file system, which may be accessed online. Any part of this system or environment may be accessed to verify its contents. A possible setup for this data store may include an application front-end that has a pool of application servers that deliver the data from the applications and/or file system.

Figure 6:
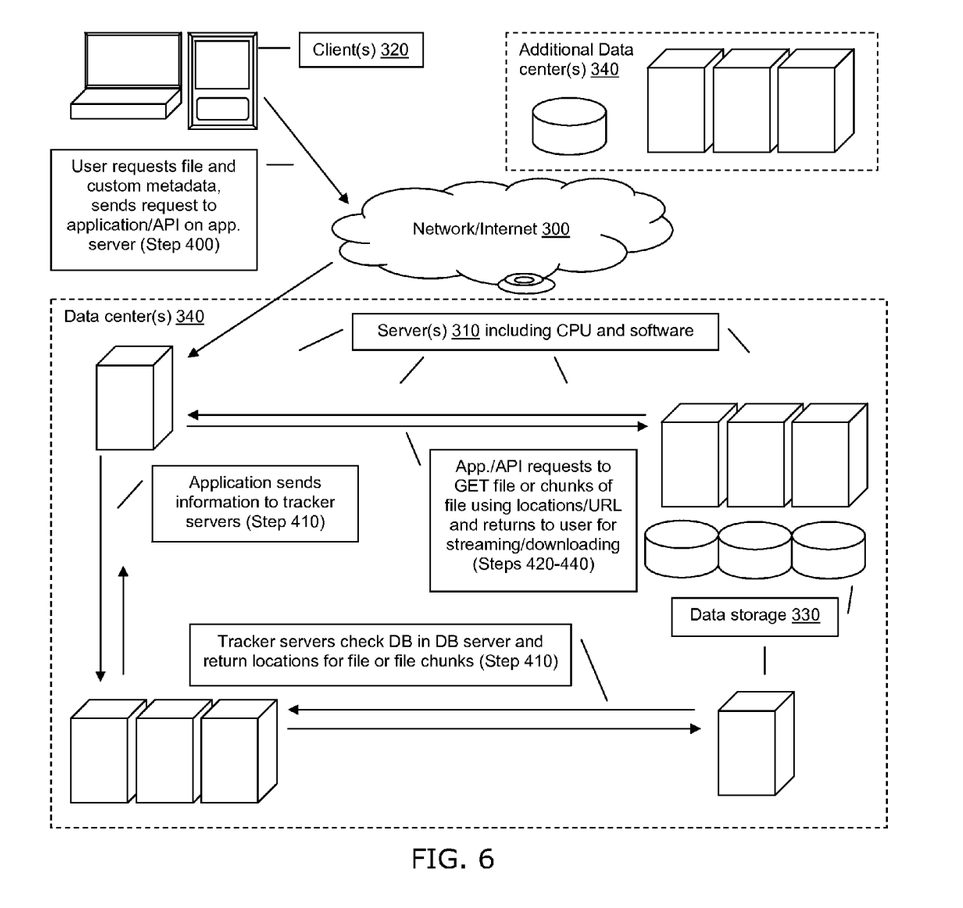
FIG. 6 illustrates a possible system for reading a file from a cloud storage solution.

FIGS. 2 and 6 demonstrate a streamlined example of such a system/environment and illustrate a non-limiting example of a system and/or structure that may be used to accomplish the methods and embodiments disclosed and described herein. Such methods may be performed by any central processing unit (CPU) in any computing system, such as a microprocessor running on at least one server 310 and/or client 320, and executing instructions stored (perhaps as scripts and/or software, possibly as software modules/components) in computer-readable media accessible to the CPU, such as a hard disk drive on a server 310 and/or client 320.

The example embodiments shown and described herein exist within the framework of a network 300 and should not limit possible network configuration or connectivity. Such a network 300 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 310 and at least one client 320 may be communicatively coupled to the network 300 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users, including the user storing the file, the API used to store the file, etc. Thus, as non-limiting examples, users may comprise any individual, entity, business, corporation, partnership, organization, governmental entity, and/or educational institution that may have occasion to store files in a cloud network environment. The files stored may comprise any collection of bits uploaded by the system to store. In other words, a file may be anything the system described herein stores for a user.

Servers 310 may comprise any computer or program that provides services to other computers, programs, or users either in the same computer or over a computer network 300. As non-limiting examples, the server(s) 310 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 320.

The server(s) 310 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The servers 310, possibly in server clusters, in the context of the current inventions may include one or more servers for the application/API described herein, one or more tracker servers to manage client communication and request operations from the application/API, one or more storage node servers to store the files and act as HTTP or other web servers used to store and serve web content, and one or more database servers comprising the one or more databases used to store information about the stored files, customized metadata, each server in the system and/or information about any other element of the system itself.

The software modules/components used in the context of the current invention may be stored in the memory of—and run on—at least one server 310 and/or client 320. As non-limiting examples of such software, the paragraphs below describe in detail the software modules/components which may comprise software and/or scripts containing instructions that, when executed by a microprocessor on a server 210 or client 220, cause the microprocessor to accomplish the purpose of the module/component as described in detail herein. The software may also share information, including data from data sources and/or variables used in various algorithms executed on the servers 310 and/or clients 320 within the system, between each module/component of the software as needed.

As a non-limiting example, the software modules/components for the file storage system application/API, may be stored in the memory of, and run on, one or more servers. This application/API may be a software application, including software modules and/or components used to store, load and/or perform other specific tasks on files.

The file storage system application may comprise/include a system API, or Application Programming Interface, an interface implemented by a software program to enable interaction with other software to perform the specific tasks outlined herein. An API may comprise a software-to-software interface that specifies the protocol defining how independent computer programs interact or communicate with each other. The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

A base API for the system may be written in an object oriented language, thereby allowing object oriented design and ease of use. As non-limiting examples of such object oriented languages, the Application/API may be written in C++, PHP or Perl.

The API may further comprise one or more wrapper libraries, linked with the object oriented API. A wrapper library may comprise a thin layer of code, which translates a library's existing interface into a compatible interface. These libraries may give a developer or user direct access to all of the public functions in the object-oriented language used to program the API. Non-limiting examples of such wrappers may include a PHP wrapper API and/or a Perl wrapper API for a C++ API. In one non-limiting example embodiment using a Perl wrapper, Perlxs technology may be used, giving a Perl developer direct access to all of the C++ public functions, as if the developer was writing C++.

The application/API may store a large file (files whose file size exceeds a pre-determined threshold) by separating and sending the file in chunks to the file system. The file system may then handle those chunks as individual files. This means that each chunk of a file may get replicated according to replication functionality and/or replication policies described herein for purposes of "chunking," streaming and/or writing files to and reading files from the system. As a non-limiting example, the application/API may split up large files into 16 MB chunks according to its replication policy. However, this example file size should in no way limit possibly variations of file sizes or file chunking functionality.

In various embodiments, the application/API may be, but is not required to be, aware of the file size as the file is received to determine whether or not the file should be separated into chunks and/or the size of the chunks needed. The application/API may further decide the file size of the chunks based on the size of the original file. In one non-limiting example embodiment, the file chunks may be stored according to an initial or original "parent" file chunk, with several related "child" chunks, thereby allowing more efficient storage and retrieval of the complete file.

The replication policy may include a "desired state" or a desired count of replicated files for each file, possibly in a certain unique class for each file. This desired state or desired count may be a property of the class to which the file belongs, and files may be replicated according to this desired count or desired state. This desired state or desired count of replicated files may define how many times the files in that class need to be replicated onto different devices in order to provide and control redundancy/replication, to provide and control file retention, and/or to ensure redundancy among the data to prevent loss. There may also be additional replication policies defined, possibly in and/or for each class of files.

For instance, for an online social media hosting site for videos, a user may require original AVI files to have a desired state or desired replica count of 2, but thumbnails and scaled versions may only have a replica count of 1. If the user were to lose the only copy of a thumbnail, the application may just rebuild it. In this way, the file system may avoid having data storage that would otherwise be storing multiple copies of data unnecessarily.

The system may comprise software components comprising algorithms for writing files to the file storage system and reading files from the file storage system, by breaking the file into smaller chunks and writing these chunks to storage nodes or elsewhere in the file storage system according to the system's replication policy. These software components may then retrieve the file or the chunks required to retrieve the file when reading the files, possibly as a stream, from the file storage system. Writing to and reading from the system may be accomplished through an interface displayed to a user on a client, illustrated, as non-limiting examples, in FIGS. 2 and 5. This interface may then pass the file and/or metadata information (or a request for such a file or metadata information) to the application/API for processing (Step 100). This user interface, used in conjunction with the application/API may also give the user the ability to store custom meta information with and about the files stored in the file storage system.

The client 320 may be any computer or program that provides services to other computers, programs, or users either in the same computer or over a computer network 300. As non-limiting examples, the client 320 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non-limiting example programming environments for client applications may include JavaScript/AJAX (client side automation), ASP, JSP, Ruby on Rails, Python's Django, PHP, HTML pages or rich media like Flash, Flex or Silverlight.

Clients 320 that may be used to connect to the network 300 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server 310. These may be, but are not limited to being accessed by a remote desktop program and/or a web browser, as are known in the art.

The user interface displayed on the client(s) 320 or the server(s) 310 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the file storage system, or any other information, may be accepted using any field, widget and/or control used in such interfaces, including but not limited to a text-box, text field, button, hyper-link, list, drop-down list, check-box, radio button, data grid, icon, graphical image, embedded link, etc.

After receiving input from a user, the user interface on the client 320 and/or the application/API may then forward the file and/or user metadata, requests, operations and/or other information to one or more tracker servers within the system. These tracker servers may be specified event-based servers that contain a process management system to manage all communication between the one or more servers in the file storage system and the application/API. These trackers may ensure that all other servers, applications, databases and/or any other system elements/components are fully operational, thereby acting as "watchdogs" over the system. The tracker servers may comprise one or more event-based parent processes (which may communicate with one or more "child processes" described below) and/or a message bus to manage all client communication from applications requesting operations to be performed, possibly including the application/API and/or user interface on the client 320.

The tracker servers may use load-balancing techniques to increase performance for the connecting application/API. Load balancing may comprise any technique, component (such as one or more load balancers) and/or software used to spread work between a plurality of servers, computers, processes, hard disks or other resources in order to get optimal resource utilization. Load balancing may also decrease computing time and/or increase the capacity of a server cluster or "server farm" beyond that of a single server.

The tracker servers (and storage node servers, described herein) may comprise one or more "workers," also referred to as "child processes," "worker processes," "background worker processes," "job workers" and/or "query workers," comprising software components/processes which run in the background to accomplish designated tasks. These workers may comprise any configuration of software and/or hardware disclosed herein. The tracker servers (and/or storage node servers) may also handle all communication between these child processes.

The system may use any load balancing techniques and components to load balance requests from the application/API onto one or more of these worker processes. For example, two or more trackers may be run on different hosts, thereby creating a High Availability environment. The system may have a plurality of job workers per tracker, and most of these jobs may be scaled up at runtime, possibly by requesting the parent process to create more workers, which may affect processing speed. Having too many query workers may add unnecessary load to the servers 310 and database, so the system may also scale down job workers per tracker to increase processing speed. Requesting fewer workers may allow the parent process to slowly remove workers as they complete their designated tasks. The user may also stop or reset all workers by requesting zero workers in the process, waiting until they are removed by the parent process and starting them up again.

In one non-limiting example embodiment, the workers may include a special "job master" worker process, with each tracker server only having one job master worker. This worker may poll the database and consolidate fetching jobs to process from one or more system queues, such as database queues, leaving other individual workers free from such tasks. It may monitor and populate one or more internal, persistent and/or shared system queues, such as work queues for deleting, replicating, etc.

Other "child worker" processes on the tracker servers may include Query workers, Replication workers, Monitor workers, Delete workers, Process Management Validator workers, Sync workers, Reaper workers, Rebalance workers, "Reapalance" workers, or any combination thereof.

The tracker servers may include one or more Query workers, configured to answer and perform requests from the calling application/API and/or other applications/interfaces on the client 320. Query workers may be the only workers that interact and/or interface directly with the application/API and/or any other applications on the client 320. When a user/client 320 connects to the system, it may establish a connection with the parent process on a tracker server. When a request is issued, the parent process may send the request to an idle worker for processing. If there are no idle workers available, the request may be queued in a system queue for later processing. The system may monitor and display pending queries and the average number of Query workers to the user.

The tracker servers may include one or more Replication workers, which may ensure that the specified replication policy is fulfilled. As previously disclosed, files, based on their "class," may be automatically replicated between enough different storage node servers, or elsewhere in the file storage system, to satisfy the desired state or desired count of replicated files requested by their class. Replication workers may automatically check a file against the replication policy, and make more copies of the file within specific storage nodes based on the policy, possibly by dividing larger files into chunks and replicating these chunks. In addition to the Reaper, Rebalance and "Reapalance" workers described herein, the Replication workers may also handle drain and rebalance. As with other workers, additional Replication workers may be added if the user feels it takes too long to replicate files.

The tracker servers may include one or more Monitor workers, configured to monitor the health and status of hosts and devices, to ensure all files, locations of files, storage node devices, or any other components of the file storage system are reachable. The Monitor workers may verify that each copy of the file is stored where it is supposed to be, that the file exists and is the correct length. If the file is missing, indicated by no working paths, the Monitor workers may attempt to find the file on any monitored devices. The Monitor workers may constantly contact all devices and/or check the database to see which files, monitored devices and/or other system components are available and online. If a device becomes unavailable on its own, the Monitor worker may note that change to all the workers a tracker server or storage node server runs, then notify the workers of the tracker or other server's return, assuming the server recovers. The Monitor worker may be a unique process to each tracker.

The tracker servers may include one or more Delete workers, configured to trigger files for deletion based on an archiving algorithm. In other words, the Delete workers may process system queues, such as delete queues, to permanently remove deleted and/or overwritten files and/or may remove "dead" temporary files from failed uploads. As with other workers, additional Delete workers may be added if the user feels it takes too long to delete files, or if they feel database tables for tracking deletion are expanding too quickly.

The tracker servers may include one or more Process Management Validator workers, configured to validate the process management system that manages all communication from the Application/API and throughout the file management system. These Process Management Validator workers may ensure that all other worker processes are up and functioning properly, and may ensure that all other servers are operational within a given instance of the file storage system.

The tracker servers may include one or more Sync workers, configured to make sure that the entire system stays balanced. The Sync workers may accomplish this by cleaning queues of expired files, removing temporary files that failed or were stopped short of their upload and ensuring that each file that is uploaded in the system has a valid replication policy.

The tracker servers may include one or more Reaper workers, one or more Rebalance workers and/or one or more "Reapalance" workers. Any of these processes may use a system queue, such as the replication queue, to complete their task. They may ensure that the traffic in the queue does not meet a certain threshold. Before populating the replication queue, the system may calculate on the fly how many bytes are flowing through the network. If the number of bytes flowing through the network is less than a configurable threshold, additional workers/tasks may be added to the queue. If the number of bytes flowing through the network is greater than or equal to the configured threshold, then the system may wait until the queue empties.

The Reaper workers may process devices recently marked as "dead." Reaper workers may make sure that files from a dead device are copied from another valid location to fulfill the replication policy. In addition, Reaper workers may delete the location for files and file copies on the dead devices, possibly from databases in data storage 330. The Reaper workers may schedule replication in order to attempt to repair the files and/or may re-enqueue the files for replication after a disk or other device fails. The Reaper worker may be very aggressive to facilitate a speedy recovery from the loss of a device.

A Rebalance worker process may consist of draining code that acts the same as the Reaper worker above, with the distinction that the Rebalance worker and/or the tracker server that the Rebalance worker is associated with may use itself as a valid location. The Reaper worker process may also be transformed into a Reaper and Rebalance worker process, or a "Reapalance" worker process, comprising the functionality of both the Reaper and Rebalance worker processes, and including the ability to use itself as a valid location.

Storage node servers may be servers where the files are stored. The storage node servers may use any combination of servers including one or more HTTP web servers that allow for basic HTTP request functionality, such as PUT, DELETE, GET, etc. These server computers may be configured to use two or more different servers, possibly on different ports.

As a non-limiting example, the combination of one or more web servers on the storage node servers may handle any request messages from the client and/or application/API to store and/or serve web content. The web servers may be configured to handle any of the defined request methods for HTTP, including, but not limited to GET, used to request a representation of a specified resource, PUT, used to upload a representation of a specified resource, DELETE, used to delete a specified resource, etc.

In addition to severing web content, the storage node servers may run one or more file-storage-system parent processes that may have one or more additional workers of their own, to ensure the system stays running smoothly. Although specific examples of workers herein are associated with tracker servers and storage node servers respectively, any of the disclosed worker processes may be found on any server within the file storage system. In addition, the functionality of the individual workers is not limited to that disclosed.

The storage node servers may include one or more CheckSum workers, used to perform checksums on files that are stored within the system. These checksums may detect limited and accidental modification and/or errors introduced during transmission and/or storage, such as corruption to stored data or errors in a communication channel. The integrity of the data and/or file, may be checked by re-computing the checksum and comparing it with a stored one. If the checksums do not match, the data may have been altered.

The storage node servers may include one or more DiskManagerinitializer workers, used to format and manage new disks. The storage node servers may also include one or more DiskManager workers, used to manages the health of the disk and report storage statistics of the disk. As non-limiting examples, the DiskManager worker may use information from common disk checking file system utilities and commands such as -ls to list directory contents and -df to report free disk space, possibly applying these commands on UNIX compatible machines. The DiskManager worker may also use a device file, possibly used to access specific resources on those devices, such as disk partitions and/or one or more software suites used to facilitate configuration, remote monitoring and management of high-performance computing clusters.

The storage nodes may include one or more FileBuilder, FileCount, FileDelete, IOStat, MetaStore, Sync and/or DB Restore workers. FileBuilder workers may handle requests to build files (XML). FileCount workers may count the number of files stored on every device. FileDelete workers may determine the files that should be deleted and remove them. IOStat workers may report the performance and/or status of utilized devices in a regular, possibly 30-second, interval. MetaStore workers may ensure that meta information is stored about each file on the system. Sync workers may search through the file system and validate that information about every file is located in the database by looking through ".meta" files that are stored by the MetaStore workers. DB Restore workers may restore any files needed to be restored after the Sync workers have validated all files.

The server(s) 310 and/or client(s) 320 may be communicatively coupled, possibly through the network 300, to data storage 330, which may include one or more databases of file information, server information, custom or other metadata information and/or any other information requested or required by the system. The data storage 330 may be any computer components, devices, and/or recording media that may retain digital data used for computing for some interval of time. The storage may be capable of retaining stored content for any data required, on a single machine or in a cluster of computers over the network 300, in separate memory areas of the same machine such as different hard drives, or in separate partitions within the same hard drive, such as a database partition.

Non-limiting examples of the data storage 330 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 330 may comprise any collection of data. As non-limiting examples, the data storage 330 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The servers 310 or software modules within the servers 310 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The data storage may contain a database, which may be a central component of the system. This database may store, as non-limiting examples, information about every server or other component within the system, including its location, status, etc. It may also maintain namespaces, file locations and file metadata as well. Both tracker servers and storage node servers may communicate with the database for information. In one embodiment, the system may require all trackers and storage node servers to point to the same database, to accommodate transactions and exclusive locks used to coordinate individual processes and trackers.

The database may be setup in a High Availability (HA) or Failover configuration so that there isn't a single point of failure. Redundancies in servers and software may be used to provide service when system components fail. Likewise, the system may detect hardware/software faults and immediately restart the application on another system without requiring administrative intervention.

As previously mentioned, the database may store system metadata such as the namespace, and which files are where. This and other metadata may be custom metadata accepted from the user, via the user interface on the client 320. This custom meta data may be accepted, stored in the database, retrieved as required and used by the system to more efficiently write to and read from the file system.

One or more data center(s) 340 may provide hosting services for the various servers, web servers, HTTP servers, application servers, database servers, and/or any related hosted website described herein including, but not limited to hosting one or more computers or servers in a data center 340 as well as providing the general infrastructure necessary to offer hosting services to Internet users including hardware, software, Internet web sites, hosting servers, and electronic communication means necessary to connect multiple computers and/or servers to the Internet or any other network 300. These data centers 340 or the related clients 320 may accept messages from text messages, SMS, web, mobile web, instant message, third party API projects or other third party applications.

Reading a File from a Cloud Storage Solution

Several different methods may be used to provide and manage the disclosed invention. In an example embodiment illustrated in FIGS. 4-6, one or more software components or method steps executed using the system and environment described in detail herein and executed on one or more servers 310 or clients 320, may accept a selection of one or more files to be read from the file storage system solution. The disclosed method steps may describe one non-limiting example of a happy path of getting a file from the application/API.

Figure 5:
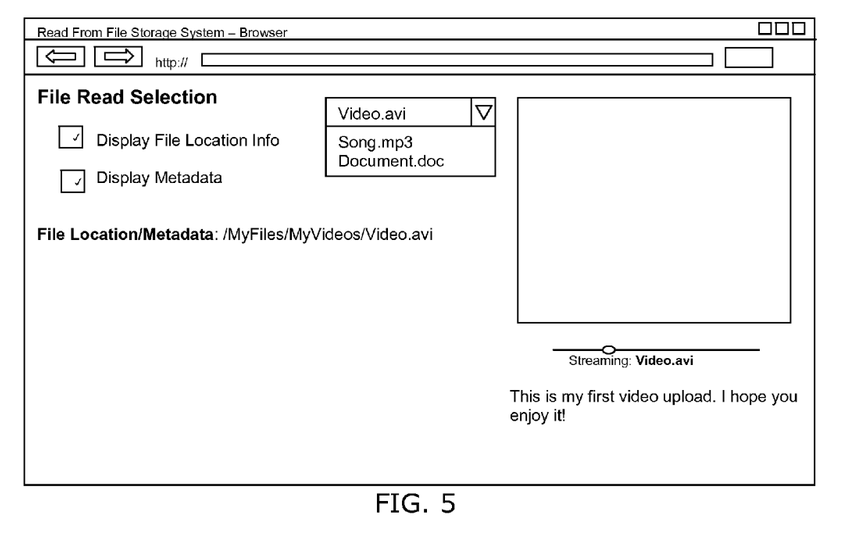
FIG. 5 illustrates a possible embodiment of an interface for reading a file from a cloud storage solution.

As a non-limiting example, FIG. 5 shows an interface on a client from which for a user to request a file from, as non-limiting examples, an FTP site, an online file folder storage software, such as The Go Daddy Group's ONLINE FILE FOLDER, a video-based social media website, such as The Go Daddy Group's VIDEO.ME, etc. In this non-limiting example, the user may request to, as non-limiting examples, download the file, stream the file, display customized metadata about the file and/or display storage information such as file location about the file.

Figure 4:
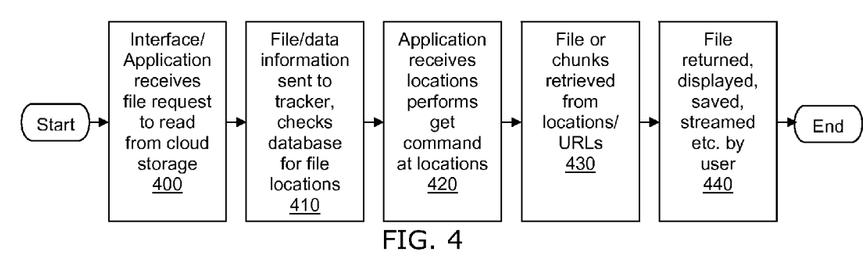
FIG. 4 is a flow diagram illustrating a possible embodiment of a method for reading a file from a cloud storage solution.

A user interface displayed on a client may receive a selection of a requested file stored and distributed, possibly in replicated chunks, among a plurality of storage node servers or elsewhere in the file storage system, possibly for streaming or download purposes (Step 400). The user may also request a plurality of file location and/or metadata information, possibly customized metadata information, stored in a database in data storage 330. The customized metadata may have been previously entered by the user to customize information about or associated with the file, system elements and/or system configurations. The user request may then be sent to an application/API (Step 400).

The application/API may communicate to the tracker what file it wants to read (Step 410). The tracker may check the database to find all of the user's requested file locations and/or any other relevant information about the path to the requested file within the storage nodes or elsewhere in the file storage system (Step 410). If the file was stored in separated chunks, due to the original file exceeding a pre-determined threshold of file size, the application/API may be required to request file locations for each of the chunks that make up the completed file.

The tracker servers may return the file locations for the user's requested file or file chunks to the application/API, which may be displayed to the user on the client 220, so that the user and/or application/API know the exact location of the file or file chunks requested (Step 420). One or more Uniform Resource Locators, or URLs, associated with the one or more file locations may be displayed to the user, as well as forwarded to the application/API.

Once the user and/or application/API knows the exact location/URL from which to fetch the requested file and/or file chunks, the application/API may perform an HTTP request, possibly a GET command, on that location and/or plurality of locations for file chunks (Step 430). The contents of the file may be retrieved, displayed, downloaded and/or streamed to the user (Step 440).

The steps included in the embodiments illustrated and described in relation to FIGS. 1-6 are not limited to the embodiment shown in FIGS. 1 and 4 and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising:
   A) receiving, by one or more server computers communicatively coupled to a network, a request to store a file, and a customized metadata about said file, on said one or more server computers;
   B) populating, by said one or more server computers, one or more system queues on said one or more server computers with one or more system tasks to write said file and said customized metadata to said one or more server computers;
   C) generating at runtime, by said one or more server computers, one or more query worker modules configured to load balance said one or more system tasks; and
   D) responsive to a completion of said one or more system tasks, deleting, by said one or more server computers, each of said one or more query worker modules.

2. The method of claim 1, wherein one or more event-based parent processes receive said request, each of said one or more event-based parent processes comprising a message bus configured to:
   i) receive, from one or more applications on a client computer communicatively coupled to said network, one or more requests for one or more operations to be performed;
   ii) determine if one or more idle query workers are available to respond to said one or more requests;
   iii) transmit said one or more requests to said one or more idle query workers for processing wherein, responsive a determination that said one or more idle query workers are not available, queuing said one or more requests in said system queue for later processing by said one or more idle query workers
   iv) create, communicate with, stop, reset or delete one or more child processes comprising:
      a) one or more of said one or more query worker modules; and
      b) software or scripts executed on said one or more server computers and configured to accomplish one or more designated tasks requested by an application programming interface on said one or more server computers.

3. The method of claim 1, wherein an application programming interface on said one or more server computers receives said request, said application programming interface being configured to:
   i) direct communications between said application programming interface and a client computer communicatively coupled to said network;
   ii) receive, from said client computer, said request to:
      a) store said file on said one or more server computers; and
      b) write said customized metadata about said file to a database communicatively coupled to said network;
   iii) communicate, to one or more tracker servers running on said one or more server computers, a plurality of data identifying said file and said customized metadata about said file;
   iv) receive, from said one or more tracker servers, one or more locations, on said one or more server computers, to store said file, said one or more locations having been calculated to maximize computing power for each of said one or more server computers;

v) execute a hypertext transfer protocol request, comprising a put command, to write said file to said one or more locations calculated to maximize computing power for each of said one or more server computers; and
vi) communicate, to said one or more tracker servers, said one or more locations and a confirmation that said file has been successfully written to said one or more server computers.

4. The method of claim 3, further comprising the steps of:
i) receiving from said client computer, by said application programming interface via a file upload interface on said client computer, input from a user indicating a selection of said file; and
ii) receiving from said client computer, by said application programming interface, said customized metadata about said file.

5. The method of claim 4, wherein said file upload interface further comprises:
i) a file upload dialog comprising any combination of one or more checkboxes, one or more drop-down lists and a plurality of drag and drop technology configured to move said file from said client computer to said one or more server computers;
ii) a text box configured to receive from said user said customized metadata about said file; and
iii) one or more software instructions to send said file, and said customized metadata, from said client computer to said application programming interface.

6. The method of claim 3, further comprising the steps of:
i) receiving, by said one or more server computers, said file from said client computer;
ii) identifying, by said one or more server computers upon receipt of said file, a size of said file;
iii) determining, by said one or more server computers, whether said size of said file exceeds a predetermined threshold for a file size according to a class for said file and a replication policy for said class; and
iv) responsive to a determination that said file exceeds said predetermined threshold for said file size:
a) identifying, by said one or more server computers, a file piece size for a plurality of file pieces to be divided from said file, said file piece size being based on said size of said file;
b) dividing said file, by said one or more server computers, into said plurality of file pieces comprising a file parent piece and one or more file children pieces;
c) storing, by said one or more server computers, said plurality of file pieces, said storage facilitating a retrieval or a streaming of said file;
d) storing, by said one or more server computers, each of said plurality of file pieces at said one or more locations calculated to maximize computing power for each of said one or more server computers; and
e) replicating, by said one or more server computers, said plurality of file pieces according to said replication policy determined by said class of said file.

7. The method of claim 1, wherein said file is uploaded to an FTP site, an online file folder or a video-based social media website.

8. The method of claim 3, further comprising the steps of:
i) directing communications, by said one or more tracker servers, between said application programming interface and said one or more server computers;
ii) receiving from said application programming interface, by said one or more tracker servers, a plurality of data identifying said file, and said customized metadata about said file;
iii) requesting and receiving from said database, by said one or more tracker servers, said one or more available locations on said one or more server computers to store said file, said one or more available locations having been calculated to maximize computing power for each of said one or more server computers;
iv) transmitting to said application programming interface, by said one or more tracker servers, said one or more locations;
v) receiving from said application programming interface, by said one or more tracker servers:
a) confirmation that said file has been successfully written to said one or more server computers; and
b) said one or more locations to which said file was written;
vi) storing in said database, by said one or more tracker servers, said one or more locations to which said file was written;
vii) storing said customized metadata about said file, by said one or more tracker servers, to said database;
viii) initializing, by said one or more tracker servers, said plurality of query worker modules; and
ix) replicating, by said one or more tracker servers, said file among said one or more server computers according to a replication policy determined by a class to which said file belongs.

9. The method of claim 1, wherein said one or more query worker modules comprise:
i) one or more process management validator worker modules;
ii) one or more sync worker modules;
iii) one or more checksum worker modules; and
iv) one or more meta store worker modules.

10. The method of claim 1, wherein said one or more query worker modules comprise:
i) one or more monitor worker modules
ii) one or more reaper and rebalance worker modules; and
iii) one or more delete worker modules.

11. The method of claim 1, wherein said one or more query worker modules comprise one or more replication worker modules configured to:
i) automatically check said file against a replication policy;
ii) replicate one or more copies of said file on said one or more server computers according to said replication policy; and
iii) manage a drain and a rebalance of said one or more server computers.

12. The method of claim 11, wherein said replication policy:
i) comprises a desired state comprising a desired count of one or more replicated files for said file, said desired count comprising:
a) a property of a class to which said file belongs; and
b) a definition of how many times one or more files in said class need to be replicated within said one or more server computers to ensure redundancy and to prevent data loss within said one or more files;
ii) requires a predetermined number of valid copies of said one or more replicated files to exist prior to transmitting a confirmation of a successful write of said file;
iii) satisfies said desired state; and
iv) provides and controls a retention of said file.

13. The method of claim 3, further comprising one or more storage node servers comprising:
   i) a server cluster of one or more application servers comprising a large distributed data store configured to provide and control a redundancy, a replication and a file retention for said file; and
   ii) a cloud storage file system which is:
      a) accessed online;
      c) accessible to verify the contents of said cloud storage file system; and
      b) configured to:
         1) store said file;
         2) handle one or more request messages to store or serve a plurality of web content from said application programming interface; and
         3) act as a web server to store and serve said file and a plurality of other web content configured to handle hypertext transfer protocol request functionality.

14. The method of claim 13, wherein said one or more storage node servers are configured to run one or more parent processes and one or more child processes comprising:
   i) one or more disk manager initializer worker modules configured to format one or more disks used by said one or more storage node servers;
   ii) one or more disk manager worker modules configured to:
      a) manage the health of said one or more disks and report storage statistics of said one or more disks;
      b) facilitate configuration, remote monitoring and management of said server cluster;
   iii) one or more file builder worker modules configured to handle one or more requests to build one or more files on said one or more server computers;
   iv) one or more file count worker modules configured to count said one or more files stored on said one or more server computers;
   v) one or more file delete worker modules configured to determine said one or more files flagged for deletion and delete said one or more files flagged for deletion;
   vi) one or more input output statistic worker modules configured to report performance or status of said one or more server computers in a regular interval; and
   vii) one or more storage sync worker modules configured to search through said one or more server computers and validate that a plurality of data about each of said one or more files is located in said database.

15. The method of claim 13, wherein said database further comprises:
   i) said one or more locations to store said file, said one or more locations having been calculated by said one or more server computers to maximize computing power for each of said one or more server computers;
   ii) a plurality of location metadata for said one or more locations for said file;
   iii) said customized metadata about said file;
   iv) one or more location, configuration and status data for:
      a) said application programming interface;
      b) said one or more tracker servers;
      c) one or more storage node servers; and
      d) one or more database servers; and
   v) one or more namespaces for said file, said one or more namespaces being linked to a plurality of information about said file used to more efficiently write to and read from said one or more server computers, said one or more namespaces comprising:
      a) a key comprising a unique textual string used to identify said file;
      b) a file class comprising the file which specifies a desired count or a desired state for file replication according to a replication policy;
      c) a file domain comprising said file and said file class within a set of classes comprising a top-level separation of one or more files and comprising a set of classes that define said one or more files within said file domain; and
      d) a file id comprising a unique internal numerical representation of said file.

16. A method, comprising:
   A) receiving, by one or more server computers communicatively coupled to a network, a request to read a file, and a customized metadata about said file, from said one or more server computers;
   B) populating, by said one or more server computers, one or more system queues on said one or more server computers with one or more system tasks to read said file and said customized metadata from said one or more server computers;
   C) generating at runtime, by said one or more server computers, one or more query worker modules configured to load balance said one or more system tasks; and
   D) responsive to a completion of said one or more system tasks, deleting, by said one or more server computers, each of said one or more query worker modules.

17. The method of claim 16, wherein one or more event-based parent processes receive said request, each of said one or more event-based parent processes comprising a message bus configured to:
   i) receive, from one or more applications on a client computer communicatively coupled to said network, one or more requests for one or more operations to be performed;
   ii) determine if one or more idle query workers are available to respond to said one or more requests;
   iii) transmit said one or more requests to said one or more idle query workers for processing wherein, responsive a determination that said one or more idle query workers are not available, queuing said one or more requests in said system queue for later processing by said one or more idle query workers
   iv) create, communicate with, stop, reset or delete one or more child processes comprising:
      a) one or more of said one or more query worker modules; and
      b) software or scripts executed on said one or more server computers and configured to accomplish one or more designated tasks requested by an application programming interface on said one or more server computers.

18. The method of claim 16, wherein an application programming interface on said one or more server computers receives said request, said application programming interface being configured to:
   i) direct communications between said application programming interface and a client computer communicatively coupled to said network;
   ii) receive, from said client computer, said request to:
      a) read or stream said file from said one or more server computers; and
      b) read said customized metadata about said file from a database communicatively coupled to said network;
   iii) communicate, to one or more tracker servers running on said one or more server computers, a plurality of data identifying said file and said customized metadata about said file;

iv) receive, from said one or more tracker servers, one or more locations, on said one or more server computers, where said file is stored, said one or more locations having been calculated to maximize computing power for each of said one or more server computers;

v) execute a hypertext transfer protocol request, comprising a get command, to read or stream said file from said one or more locations; and vi) transmit, for download or streaming, said file from said one or more locations on said one or more tracker server modules to said client computer.

19. The method of claim 18, further comprising the steps of:

i) receiving from said client computer, by said application programming interface via a user interface on said client computer, input from a user indicating a selection of said file; and ii) transmitting to said client computer, by said one or more server computers, said file, or a stream of said file, and said customized metadata.

20. The method of claim 19, wherein said user interface on said client computer is configured to display said file and said customized metadata.

21. The method of claim 18, further comprising the steps of, responsive to a determination that said file has been separated and stored in one or more file pieces:

i) requesting, by said application programming interface, one or more file piece locations from said one or more tracker servers; and ii) receiving from said one or more tracker servers, by said application programming interface:
a) one or more file piece locations; and
b) said one or more file pieces.

22. The method of claim 16, wherein said file is downloaded or streamed from storage on an FTP site, an online file folder or a video-based social media website.

23. The method of claim 18, further comprising the steps of:

i) directing communications, by said one or more tracker servers, between said application programming interface and said one or more server computers;

ii) receiving from said application programming interface, by said one or more tracker servers:
a) said request to read or stream said file from said one or more server computers;
b) said request to read said customized metadata about said file from said database; and
c) said plurality of data identifying said file and said customized metadata about said file;

iii) requesting and receiving from said database, by said one or more tracker servers, said one or more locations, on said one or more server computers, where said file is stored;

iv) transmitting to said application programming interface, by said one or more tracker servers, said one or more locations; and v) initializing, by said one or more tracker servers, said plurality of query worker modules.

24. The method of claim 16, wherein said one or more query worker modules comprise:

i) one or more process management validator worker modules;

ii) one or more sync worker modules;

iii) one or more checksum worker modules; and iv) one or more meta store worker modules.

25. The method of claim 16, wherein said one or more query worker modules comprise:

i) one or more monitor worker modules ii) one or more reaper and rebalance worker modules; and iii) one or more delete worker modules.

26. The method of claim 16, wherein said one or more query worker modules comprise one or more replication worker modules configured to:

i) automatically check said file against a replication policy;

ii) replicate one or more copies of said file on said one or more server computers according to said replication policy; and iii) manage a drain and a rebalance of said one or more server computers.

27. The method of claim 26, wherein said replication policy:

i) comprises a desired state comprising a desired count of one or more replicated files for said file, said desired count comprising:
a) a property of a class to which said file belongs; and
b) a definition of how many times one or more files in said class need to be replicated within said one or more server computers to ensure redundancy and to prevent data loss within said one or more files;

ii) requires a predetermined number of valid copies of said one or more replicated files to exist prior to transmitting a confirmation of a successful write of said file;

iii) satisfies said desired state; and iv) provides and controls a retention of said file.

28. The method of claim 18, further comprising one or more storage node servers comprising:

i) a server cluster of one or more application servers comprising a large distributed data store configured to provide and control a redundancy, a replication and a file retention for said file; and ii) a cloud storage file system which is:
a) accessed online;
c) accessible to verify the contents of said cloud storage file system; and
b) configured to:
1) store said file;
2) handle one or more request messages to store or serve a plurality of web content from said application programming interface; and
3) act as a web server to store and serve said file and a plurality of other web content configured to handle hypertext transfer protocol request functionality.

29. The method of claim 28, wherein said one or more storage node servers are configured to run one or more parent processes and one or more child processes comprising:

i) one or more disk manager initializer worker modules configured to format one or more disks used by said one or more storage node servers;

ii) one or more disk manager worker modules configured to:
a) manage the health of said one or more disks and report storage statistics of said one or more disks;
b) facilitate configuration, remote monitoring and management of said server cluster;

iii) one or more file builder worker modules configured to handle one or more requests to build one or more files on said one or more server computers;

iv) one or more file count worker modules configured to count said one or more files stored on said one or more server computers;

v) one or more file delete worker modules configured to determine said one or more files flagged for deletion and delete said one or more files flagged for deletion;

vi) one or more input output statistic worker modules configured to report performance or status of said one or more server computers in a regular interval; and
vii) one or more storage sync worker modules configured to search through said one or more server computers and validate that a plurality of data about each of said one or more files is located in said database.

30. The method of claim 28, wherein said database further comprises:
i) said one or more locations storing said file, said one or more locations having been calculated by said one or more server computers to maximize computing power for each of said one or more server computers;
ii) a plurality of location metadata for said one or more locations storing said file;
iii) said customized metadata about said file;
iv) one or more location, configuration and status data for:
   a) said application programming interface;
   b) said one or more tracker servers;
   c) one or more storage node servers; and
   d) one or more database servers; and
v) one or more namespaces for said file, said one or more namespaces being linked to a plurality of information about said file used to more efficiently write to and read from said one or more server computers, said one or more namespaces comprising:
   a) a key comprising a unique textual string used to identify said file;
   b) a file class comprising the file which specifies a desired count or a desired state for file replication according to a replication policy;
   c) a file domain comprising said file and said file class within a set of classes comprising a top-level separation of one or more files and comprising a set of classes that define said one or more files within said file domain; and
   d) a file id comprising a unique internal numerical representation.

\* \* \* \* \*